US010109150B2

(12) United States Patent
Plowman

(10) Patent No.: US 10,109,150 B2
(45) Date of Patent: Oct. 23, 2018

(54) METHOD OF GAMING, A GAMING SYSTEM AND A GAME CONTROLLER

(71) Applicant: ARISTOCRAT TECHNOLOGIES AUSTRALIA PTY LIMITED, North Ryde, NSW (AU)

(72) Inventor: Gregory Leigh Plowman, Alexandria (AU)

(73) Assignee: ARISTOCRAT TECHNOLOGIES AUSTRALIA PTY LIMITED, North Ryde, NSW (AU)

( * ) Notice: Subject to any disclaimer, the term of this patent is extended or adjusted under 35 U.S.C. 154(b) by 62 days.

(21) Appl. No.: 15/141,420

(22) Filed: Apr. 28, 2016

(65) Prior Publication Data

US 2016/0321871 A1 Nov. 3, 2016

(30) Foreign Application Priority Data

Apr. 29, 2015 (AU) ................................ 2015901517

(51) Int. Cl.
*A63F 13/00* (2014.01)
*G07F 17/32* (2006.01)

(52) U.S. Cl.
CPC ........ *G07F 17/3244* (2013.01); *G07F 17/326* (2013.01)

(58) Field of Classification Search
CPC . G07F 17/326; G07F 17/3262; G07F 17/3267
See application file for complete search history.

(56) References Cited

U.S. PATENT DOCUMENTS 8,012,013 B2 * 9/2011 Walker ................ G07F 17/3244 463/21
8,632,388 B2 1/2014 Davis et al.
9,472,056 B2 10/2016 Hall et al.
9,478,102 B2 10/2016 Jaffe et al.
2004/0063483 A1 * 4/2004 Wolf .................. G07F 17/3227 463/13
2005/0070354 A1 * 3/2005 Baerlocher ......... G07F 17/3244 463/20
2008/0254847 A1 10/2008 Millerschone
2009/0124357 A1 * 5/2009 Acres ...................... G07F 17/32 463/25
2013/0331172 A1 * 12/2013 Olsen .................. G07F 17/3244 463/20

* cited by examiner

*Primary Examiner* — James S McClellan
(74) *Attorney, Agent, or Firm* — Armstrong Teasdale LLP

(57) ABSTRACT

Method and systems of gaming are provided herein. One method includes receiving a credit wager to initiate play of a base game. The method also includes awarding, in a feature game, at least two game rounds including at least an initial game round and a subsequent game round. The method also includes generating a plurality of candidate game outcomes for a plurality of game rounds, and determining, for each of the plurality of candidate game outcomes, an expected benefit to be gained from the respective candidate game outcome when generating a subsequent game outcome in the subsequent game round. The method still further includes selecting a candidate game round of the plurality of candidate game rounds having a candidate game outcome of the plurality of candidate game outcomes associated with a greatest expected benefit, and displaying the selected candidate game round on a display as the initial game round.

18 Claims, 8 Drawing Sheets

METHOD OF GAMING, A GAMING SYSTEM AND A GAME CONTROLLER

CROSS-REFERENCE TO RELATED APPLICATIONS

This application claims the benefit of priority to Australian Provisional Patent Application No. 2015901517, filed Apr. 29, 2015, the entire contents and disclosure of which are hereby incorporated by reference in their entirety.

BACKGROUND

The present invention relates to a method of gaming, a gaming system and a game controller.

Gaming systems are known that have a re-spin feature where a player can select an option to hold one or more spinning reels. The one or more held reels may be used in the generation of a subsequent game outcome.

While such gaming systems provide players with enjoyment, a need exists for alternative gaming systems in order to maintain or increase player enjoyment.

BRIEF DESCRIPTION

In one aspect, an electronic method of gaming is provided. The method is implemented using gaming system. The gaming system includes a display configured to display a wagering game, a player input interface, a credit input mechanism, and a game controller. The credit input mechanism includes at least one of a card reader, a ticket reader, a bill acceptor, and a coin input mechanism, and is configured to establish a credit balance that is increasable and decreasable based on wagering activity. The method includes receiving, via the credit input mechanism, a credit wager to initiate play of a base game. The method also includes awarding, by the game controller, in a feature game, at least two game rounds. The at least two game rounds include at least an initial game round and a subsequent game round. The method further includes generating, be the game controller, a plurality of candidate game outcomes for a plurality of game rounds. The method also includes determining, by the game controller, for each of the plurality of candidate game outcomes, an expected player benefit to be gained from the respective candidate game outcome when generating a subsequent game outcome in the subsequent game round. The method still further includes selecting, by the game controller, a candidate game round from the plurality of candidate game rounds having a candidate game outcome of the plurality of candidate game outcomes associated with a greatest expected benefit, and displaying the selected candidate game round on the display of the gaming system as the initial game round.

In another aspect, a gaming system is provided. The gaming system includes a display configured to display a wagering game, a player input interface, a credit input mechanism, and a game controller. The credit input mechanism includes at least one of a card reader, a ticket reader, a bill acceptor, and a coin input mechanism. The credit input mechanism is configured to receive a credit wager to initiate play of a base game, and establish a credit balance that is increasable and decreasable based on wagering activity. The game controller is configured to award, in a feature game, at least two game rounds. The at least two game rounds include at least an initial game round and a subsequent game round. The game controller is also configured to generate a plurality of candidate game outcomes for a plurality of game rounds. The game controller is further configured to determine, for each of the plurality of candidate game outcomes, an expected player benefit to be gained from the respective candidate game outcome when generating a subsequent game outcome in the subsequent game round. The game controller is still further configured to select a candidate game round from the plurality of candidate game rounds having a candidate game outcome of the plurality of candidate game outcomes associated with a greatest expected benefit, and display the selected candidate game round on the display as the initial game round.

In yet another aspect, a game controller for a gaming system is provided. The gaming system includes a display configured to display a wagering game, a player input interface, and a credit input mechanism. The credit input mechanism includes at least one of a card reader, a ticket reader, a bill acceptor, and a coin input mechanism, and is configured to establish a credit balance that is increasable and decreasable based on wagering activity. The game controller includes a processor configured to receive an indication of a credit wager input to the credit input mechanism to initiate play of a base game. The game controller also includes a game awarder configured to award, in a feature game, at least two game rounds. The at least two game rounds include at least an initial game round and a subsequent game round. The game controller further includes a game outcome generator configured to generate a plurality of candidate game outcomes for a plurality of game rounds. The game controller also includes a candidate game outcome assessor configured to determine, for each of the plurality of candidate game outcomes, an expected player benefit to be gained from the respective candidate game outcome when generating a subsequent game outcome in the subsequent game round. The candidate game outcome assessor is also configured to select the candidate game round from the plurality of candidate game rounds having a candidate game outcome of the plurality of candidate game outcomes associated with a greatest expected benefit. The game controller still further includes a display controller configured to control the display of the gaming system to display the selected candidate game round as the initial game round.

BRIEF DESCRIPTION OF THE DRAWINGS

An exemplary embodiment of the invention will now be described with reference to the accompanying drawings in which.

DETAILED DESCRIPTION

Figure 1:
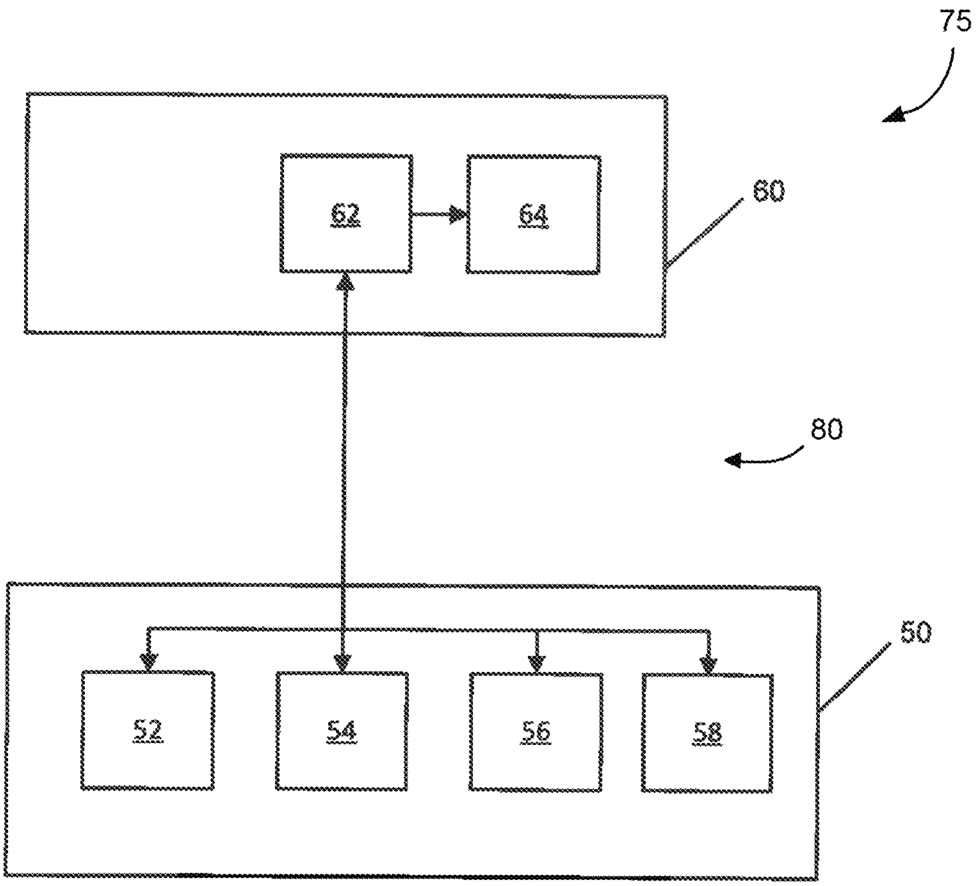
FIG. 1 is a block diagram of exemplary core components of a gaming system.

Referring to the drawings, there is shown a gaming system including a game controller. The gaming controller includes components that enable the implementation of a game, wherein when at least two game rounds (i.e., an initial game round and at least one subsequent game round) are awarded, a plurality of candidate game rounds are generated, one of which is selected as the initial game round. The gaming system assesses a game outcome of each of the candidate game rounds. In one embodiment, the candidate game round associated with the candidate game outcome that is assessed by the gaming system as being able to provide the greatest benefit in a subsequent game round is provided to the player as the initial game round. The player is then provided with an opportunity by the gaming system to select part of the game to be kept or held for a subsequent spin. For example, in one aspect, the player may select one or more reels to be "held" for a subsequent re-spin.

General Construction of an Exemplary Gaming System

The gaming system can take a number of different forms. In a first aspect, a standalone gaming machine is provided wherein all or most components required for implementing the game are present in a player operable gaming machine.

In a second form, a distributed architecture is provided wherein at least some of the components required for implementing the game are present in a player operable gaming machine and at least some of the components required for implementing the game are located remotely from the gaming machine. For example, a "thick client" architecture may be used wherein part of the game is executed on a player operable gaming machine and part of the game is executed remotely, such as by a gaming server. Alternatively, a "thin client" architecture may be used wherein most of the game is executed remotely from the gaming machine, such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may selectively operate in standalone gaming machine mode, "thick client" mode or "thin client" mode depending on several factors, including, for example, the game being played, operating conditions, and/or other factors. Other variations will be apparent to persons skilled in the art.

FIG. 1 is a block diagram of exemplary core components 80 of a gaming system 75. Irrespective of the form, gaming system 75 includes several core components 80. At the broadest level, exemplary core components 80 are a player interface 50 and a game controller 60. Player interface 50 is arranged to enable manual interaction between a player and gaming system 75 and, as such, includes input/output components 52, 54, 56, 58 required for the player to enter instructions to play the game and observe the game outcomes.

Components of player interface 50 may vary from embodiment to embodiment but will typically include at least a credit mechanism 52 to enable a player to input credits and to receive payouts, at least one display 54, a game play mechanism 56 including one or more input devices that enable a player to input game play instructions (e.g. to place a wager), and one or more speakers 58.

Game controller 60 is in data communication with player interface 50 and typically includes a processor 62 that processes the game play instructions in accordance with game play rules and outputs game play outcomes to display 54. Typically, the game play rules are stored as program code in a memory 64 but can also be hardwired. As used herein, the term "processor" refers generically to any device that can process game play instructions in accordance with game play rules and may include, for example, a microprocessor, microcontroller, programmable logic device or other computational device, a general purpose computer (e.g. a PC) or a server. That is, a processor 62 may be provided by any suitable logic circuitry for receiving inputs, processing them in accordance with instructions stored in memory 64 and generating outputs (for example on display 54). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
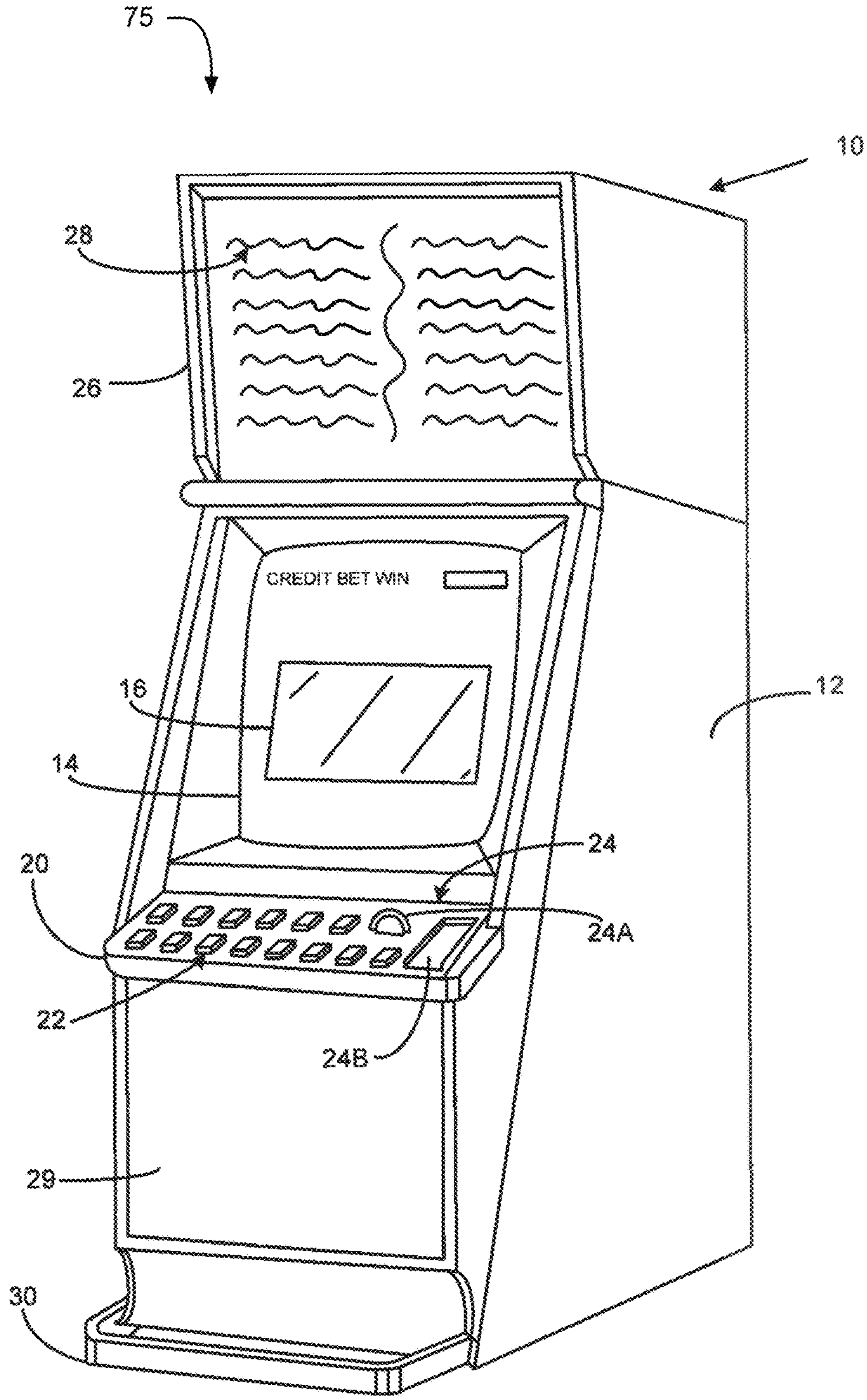
FIG. 2 is a perspective view of an exemplary standalone gaming machine.

FIG. 2 illustrates a gaming system 75 in the form of an exemplary standalone gaming machine 10. In the exemplary embodiment, gaming machine 10 includes a console 12 having a display 14 on which are displayed representations of a game 16 that can be played by a player. A mid-trim 20 of gaming machine 10 houses a bank of buttons 22 for enabling a player to interact with gaming machine 10, in particular during game play. Mid-trim 20 also houses a credit input mechanism 24. In the exemplary embodiment, credit input mechanism 24 includes a coin input chute 24A and a bill collector 24B. Other credit input mechanisms may also be employed, such as, for example, a card reader for reading a smart card, debit card, and/or credit card. Other gaming machines may be configured for ticket use, in that these gaming machines include a ticket reader for reading tickets having a value and for crediting the player based on the face value of the ticket. A player marketing module (not shown) having a reading device may also be provided for the purpose of reading a player tracking device, for example, as part of a loyalty program. The player tracking device may be in the form of a card, flash drive, or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including, for example, pay tables and details of bonus awards and other information or images relating to the game. Further artwork and/or information may be provided on a front panel 29 of console 12. In the exemplary embodiment, a payout mechanism such as a coin tray 30 is mounted beneath front panel 29 for dispensing cash payouts from gaming machine 10.

In the exemplary embodiment, display 14 is a video display unit, particularly a cathode ray tube screen device. Alternatively, display 14 may be a liquid crystal display, plasma screen, any other suitable video display unit, or the visible portion of an electromechanical device. Top box 26 may also include a display, such as, for example, a video display unit, which may be of the same type as display 14, or of a different type.

Figure 3:
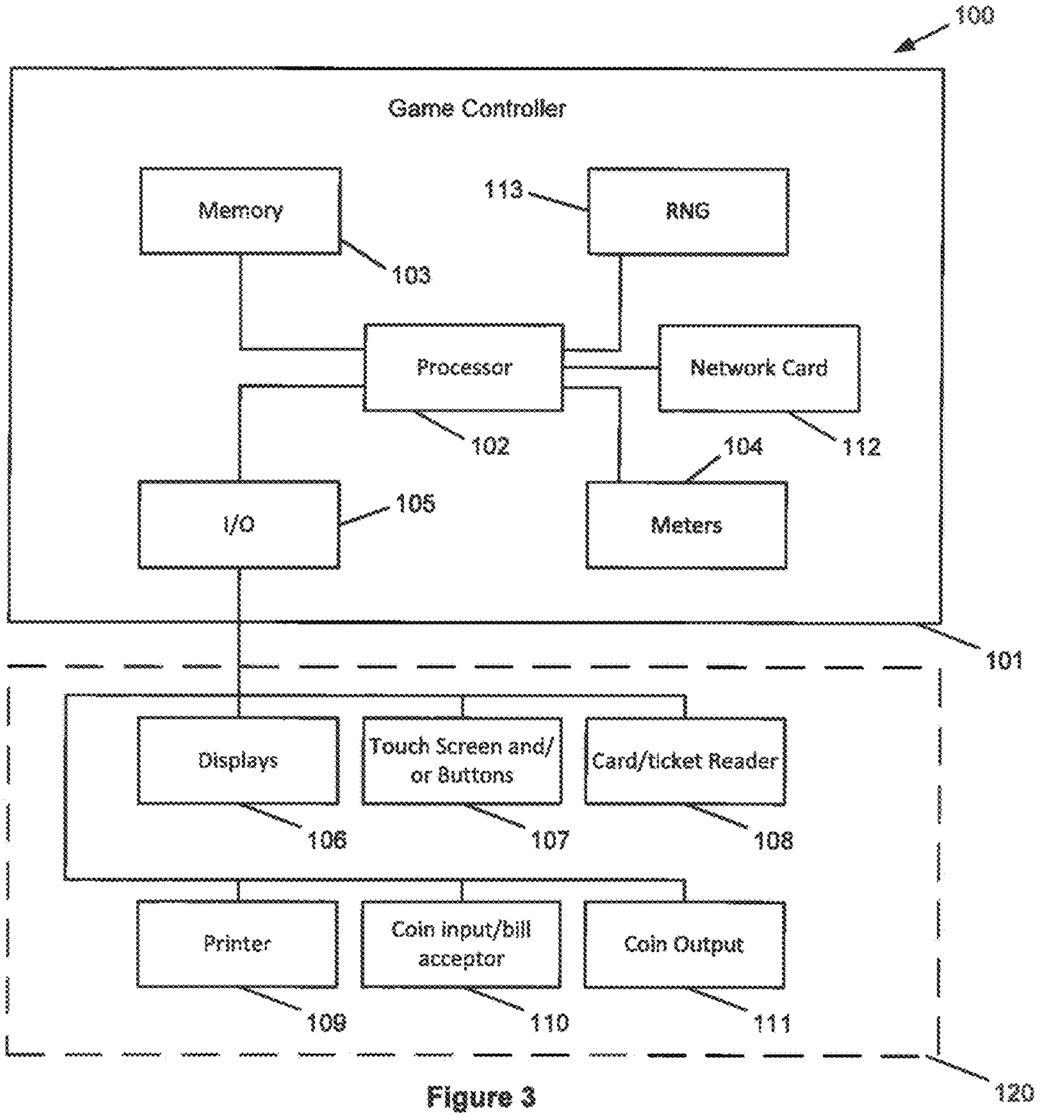
FIG. 3 is a block diagram of exemplary functional components of a gaming machine.

FIG. 3 illustrates a block diagram of exemplary functional components of a typical gaming machine 100, which may be the same as or different to gaming machine 10 (shown in FIG. 2).

Gaming machine 100 includes a game controller 101 including a processor 102 mounted on a circuit board. Instructions and data to control operation of processor 102 are stored in a memory 103 that is in data communication with processor 102. Typically, gaming machine 100 will include both volatile and non-volatile memory and more than one of each type of memory, with such memories being collectively represented by memory 103.

Gaming machine 100 includes hardware meters 104 for purposes including ensuring regulatory compliance and monitoring player credit, an input/output (I/O) interface 105 for communicating with peripheral devices of gaming machine 100. I/O interface 105 and/or the peripheral devices may be intelligent devices with their own memory for storing associated instructions and data for use with the input/output interface or the peripheral devices. A random number generator module 113 generates random numbers for use by processor 102. Persons skilled in the art will appreciate that the reference to random numbers includes pseudo-random numbers.

In the exemplary embodiment, a player interface 120 includes peripheral devices that communicate with game controller 101 including one or more displays 106, a touch screen and/or input buttons 107 (which provide a game play mechanism), and a credit input mechanism such as a card and/or ticket reader 108, a bill acceptor 110, and/or coin input mechanism 110. The credit input mechanism is configured to receive a credit wager to initiate play of a base game, and establish a credit balance (e.g., using the received credit wager) that is increasable and decreasable based on wagering activity within a game. Player interface 120 also includes a payout mechanism such as a printer 109 and/or a coin output mechanism 111. The payout mechanism is configured to output a payout to a player of gaming machine 100 based on an outcome of the game (e.g., a base game and/or a feature game). Additional hardware may be included as part of gaming machine 100, or hardware may be omitted as required for the specific implementation. For example, although buttons or touch screens are typically used in gaming machines to allow a player to place a wager and to initiate a play of a game, any input device that enables the player to input game play instructions may be used. For example, in some gaming machines, a mechanical handle may be used to initiate a play of the game. Persons skilled in the art will also appreciate that a touch screen can be used to emulate other input devices, such as, for example, a touch screen can display virtual buttons that a player can "press" by touching the screen where they are displayed.

In addition, gaming machine 100 may include a communications interface, for example, a network card 112. Network card 112 may, for example, send status information, accounting information, or other information to a bonus controller, central controller, server, or database and receive data or commands from the bonus controller, central controller, server, or database. In embodiments employing a player marketing module, communications over a network may be via player marketing module—i.e., the player marketing module may be in data communication with one or more of the above devices and communicate with it on behalf of gaming machine 100.

Figure 4:
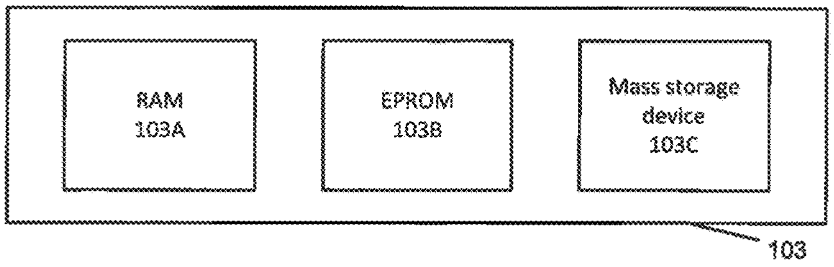
FIG. 4 is a schematic diagram of exemplary functional components of a memory.

FIG. 4 is a block diagram of the main components 103A, 103B, 103C of a memory 103. In the exemplary embodiment, memory 103 includes RAM 103A, EPROM 103B, and a mass storage device 103C. RAM 103A typically temporarily holds program files for execution by processor 102 and related data. EPROM 103B may be a boot ROM device and/or may contain some system- or game-related code. Mass storage device 103C is typically used to store game programs, the integrity of which may be verified and/or authenticated by processor 102 using protected code from EPROM 103B or elsewhere.

It is also possible for the operative components of gaming machine 100 to be distributed. For example, in one embodiment, input/output devices 106,107,108,109,110,111 are provided remotely from game controller 101.

Figure 5:
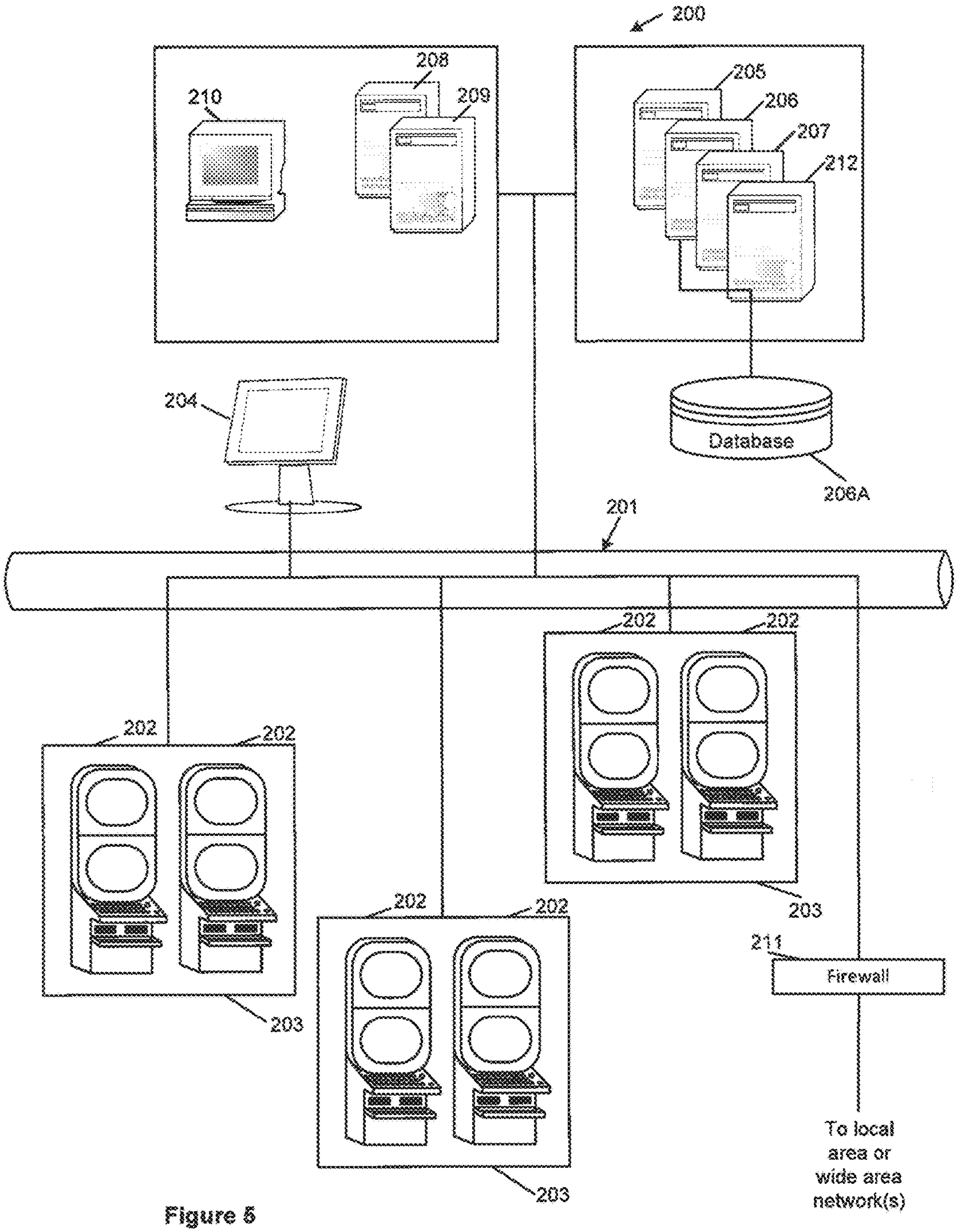
FIG. 5 is a schematic diagram of an exemplary network gaming system.

FIG. 5 illustrates an exemplary gaming system 200 in accordance with an alternative embodiment. Gaming system 200 includes a network 201, which, for example, may be an Ethernet network. In the exemplary embodiment, gaming machines 202, shown arranged in three banks 203 of two gaming machines 202, are coupled to network 201. Gaming machines 202 provide a player-operable interface and may be the same as gaming machines 10 and/or 100 (shown respectively in FIGS. 2 and 3), or may have simplified functionality depending on the requirements for implementing game play. Although banks 203 of two gaming machines 202 are shown in the exemplary embodiment, banks of one, three, or more gaming machines 202 are also envisioned.

One or more displays 204 may also be coupled to network 201. For example, displays 204 may be associated with one or more banks 203 of gaming machines 202. Displays 204 may be used to display representations associated with game play on gaming machines 202, and/or used to display other representations, for example, promotional or informational material.

In a thick client embodiment, a game server 205 implements part of the game played by a player using a gaming machine 202, and gaming machine 202 implements part of the game. With this embodiment, as both game server 205 and gaming machine 202 implement part of the game, they collectively provide a game controller. A database management server 206 may manage storage of game programs and associated data for downloading or access by gaming machines 202 in a database 206A. Typically, if gaming system 200 enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202, and gaming machine 202 essentially provides only the player interface. In such an embodiment, game server 205 provides the game controller, and gaming machine 202 receives player instructions and transmits these instructions to game server 205. Game server 205 processes the player instructions and returns game play outcomes to gaming machine 202 for display. In a thin client embodiment, such gaming machines 202 could be computer terminals, e.g., PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of gaming system 200, including, for example, a gaming floor management server 208 and a licensing server 209 to monitor the use of licenses relating to particular games. An administrator terminal 210 is provided to allow an administrator to run network 201 and the devices connected to network 201.

Gaming system 200 may communicate with other gaming systems, other local networks (for example, a corporate network), and/or a wide area network such as the Internet, for example, through a firewall 211.

Persons skilled in the art will appreciate that in accordance with known techniques, functionality at the server side of network 201 may be distributed over a plurality of different computers. For example, elements may be run as a single "engine" on one server or a separate server may be provided. For example, game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Details of the Exemplary Gaming System

In one embodiment, a gaming system is configured to provide a spinning reel game of chance in which a feature game can be triggered. When the feature game is triggered, a plurality of free games are awarded. Each free game includes an initial game round and at least one subsequent game round. Candidate game outcomes are generated for at least the initial game round, as described in more detail below.

In order to initiate a play of the gaming system, the player operates game play mechanism 56 to specify a wager that affects the win entitlement that will be evaluated for this play of the game, and the player initiates a play of the game. Hence, a player's win entitlement can vary from game to game, depending on player selections. In most spinning reel games, it is typical for the player's entitlement to be affected by the amount they wager and by selections they make (i.e., the nature of the wager). For example, a player's win entitlement may be based on how many lines they play in each game—e.g., a minimum of one line up to a maximum number of lines permitted by the game (noting that not all permutations of win lines may be available for selection)—and how much they wager per line. Such win lines are typically defined by a combination of symbol display positions, one from each reel. The symbol display positions are located relative to one another such that they form a line that extends across the reels.

In many games, the player's win entitlement is not strictly limited to the lines they have selected. For example, "scatter" pays may be awarded independently of a player's selection of pay lines, and may be an inherent part of the win entitlement.

In other embodiments, the player may obtain a win entitlement by selecting a number of reels to play and an amount to wager per reel. Such games may be marketed under the trade name "Reel Power" by Aristocrat Leisure Industries Pty Ltd. The selection of a reel means that each displayed symbol of the reel can be substituted for another symbol at one or more designated display positions. In other words, all symbols displayed at symbol display positions corresponding to a selected reel can be used to form symbol combinations with other symbols displayed at designated symbol display positions on the other reels. For example, if there are five reels and three symbol display positions for each reel, such that the symbol display positions comprise three rows of five symbol display positions, the symbols displayed in the center row may be used for non-selected reels. As a result, the total number of ways to win is determined by multiplying the number of active display positions of each reel (the active display positions being all display positions of each selected reel) and the designated display position of the non-selected reels. As a result, for five reels and fifteen display positions, there are 243 possible ways to win.

Figure 6:
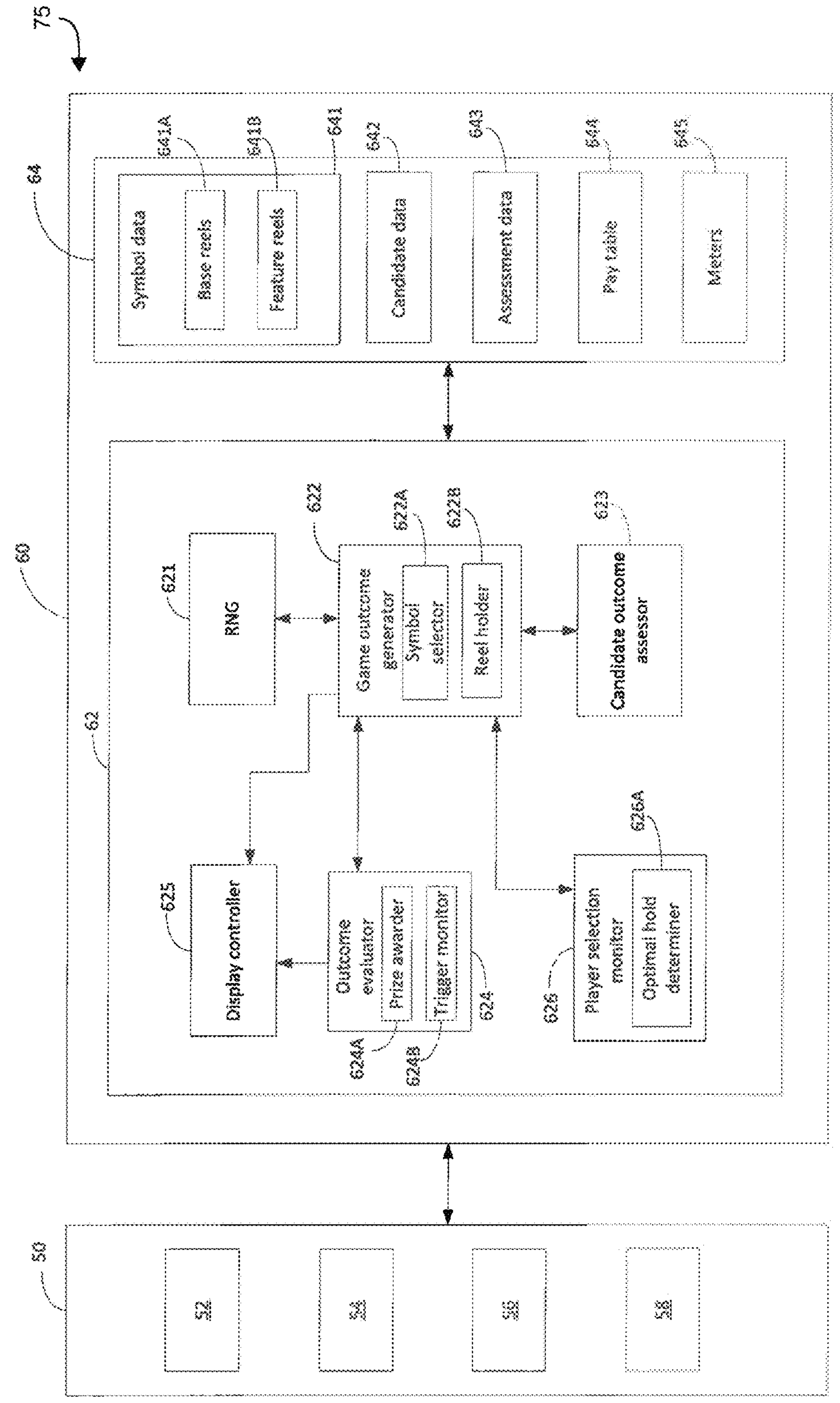
FIG. 6 is a further block diagram of an exemplary gaming system.

FIG. 6 illustrates another block diagram of an exemplary gaming system. In the exemplary embodiment, processor 62 of game controller 60 is shown implementing a number of modules based on program code and data stored in memory 64. In other embodiments, the modules could be implemented in some other way, for example, by a dedicated circuit.

These modules implement functionality that enables the game controller to implement the game. An outcome generator 622 operates in response to the player's operation of game play mechanism 56 to place a wager and to initiate a play of the game. Outcome generator 622 generates a game outcome that is evaluated by an outcome evaluator 624. In an embodiment, a symbol selector 622A of outcome generator 622 selects symbols from base reels 641A of symbol data 641, using a random number generator 621. The selected symbols are transmitted to a display controller 625, which causes the selected symbols to be displayed on display 54 at a corresponding set of display positions.

In one embodiment, symbol selector 622A selects symbols for display from a plurality of symbol sets corresponding to respective reels of a plurality of spinning reels. Base reels 641A specify a sequence of symbols for each reel, such that symbol selector 622A may select symbols by randomly selecting a stopping position in the sequence. In one example, three symbols of each of five reels may be displayed such that the symbols are displayed at fifteen corresponding display positions on display 54. In another embodiment, a probability table stored in memory 64 is used to vary the odds of a particular stop position in the sequence being selected. Other techniques may be used to control the odds of particular outcomes occurring to thereby control the return to player of the game.

Outcome evaluator 624 compares and evaluates the selected symbols against a pay table 644 based on the wager placed by the player in order to determine whether to make one or more awards. Any awards are made by a prize awarder 624A by increasing or updating meters 645 and are also displayed on display 54 via display controller 625. Outcome evaluator 624 also includes a trigger monitor 624B that monitors the symbols selected by symbol selector 622A to determine whether a trigger condition is satisfied. In one example, to satisfy the trigger condition, a defined number of scatter symbols must be selected by symbol selector 622A. If the trigger condition is not satisfied, the play of the game ends (assuming the player does not exercise a gamble option, such as a "double-or-nothing" gamble option).

If the trigger condition is satisfied, a feature game is triggered. The feature game includes a number of free games that are awarded by outcome evaluator 624 and carried out by gaming system 75. In one embodiment, the number of free games depends on the number of scatter symbols that are selected by symbol selector 622A. In one embodiment, each free game includes at least two game rounds.

In an initial game round, an initial game outcome is selected by game outcome generator 622, as described further herein. The initial game outcome is displayed on display 54 under the control of display controller 625. The player is then presented with an option to "keep" or "hold" none, part, or all of the initial game outcome. Holding part of the initial game outcome includes, for example, holding one or more reels that will not be re-spun in a subsequent game round. The player's selections and instructions to hold any part(s) of the initial game outcome are processed by and stored in a reel holder 622B, and may be further stored in memory 64. Any part(s) of the initial game outcome that are not held by the player are reselected by game outcome generator 622.

In one embodiment, for each initial game round of each free game, symbol selector 622A generates a plurality of candidate game outcomes. Each candidate game outcome is selected by symbol selector 622A from feature reels 641B. These candidate game outcomes are stored in memory 64 as candidate data 642. A candidate outcome assessor 623 assesses each candidate outcome based on assessment data 643, which enables the candidate outcome assessor 623 to assess which candidate game outcome would provide the greatest benefit when generating a subsequent game round in the free game. In one embodiment, as described in further detail below, assessment data 643 includes criteria for assessing each candidate game outcome to determine the "greatest benefit." The criteria specifies that the candidate game outcome that provides the "greatest benefit" is the candidate game outcome with the highest optimal expected win amount. In another embodiment, the criteria may identify a "greatest benefit" to the player in terms of interest to the player. For example, in such an embodiment, candidate outcome assessor 623 may assess the candidate game outcomes to determine which candidate game outcome would provide the most wins or the highest individual win amount.

In one embodiment, candidate outcome assessor 623 calculates the result of every combination of holding reels for each candidate game outcome, identifies the hold combination for each respective candidate game outcome that results in the highest average return to the player, and compares the highest average return across all candidate game outcomes to find the overall "best" candidate game outcome (e.g., the candidate game outcome associated with the overall highest average return).

For example, in one embodiment, three candidate game outcomes are assumed to be generated. For each candidate game outcome, if there are 5 reels, there are 32 different hold patterns, or ways to hold the reels (5 reels, either held or unheld; 2^5=32). For each of the 32 different hold patterns, the candidate outcome assessor 623 determines the expected win amount from that particular hold pattern.

The "optimal hold pattern" will be the hold pattern with the highest expected win amount. Candidate outcome assessor 623 then compares the expected win amounts of the respective optimal hold pattern of each candidate game outcome. Candidate outcome assessor 623 selects the candidate game outcome that is expected to deliver the greatest benefit (e.g., the candidate game outcome with an optimal hold pattern with the overall highest expected win amount) and causes display controller 625 to display the selected candidate game outcome.

The selected symbols of the plurality of reels are displayed by display controller 625 on display 54 together with a message instructing to the player to touch reels to select which reels the player wishes to be held. In one embodiment, an indicator provided on the display enables the player to determine whether they have made an "optimal" selection. In one embodiment, the player can choose not to hold any reels or can choose to hold all reels. In one embodiment, gaming system 75 prevents the player from making invalid selections, such as a selection that would automatically result in a loss. To make a selection of reels to hold, the player uses game play mechanism 56, for example, by touching one of the reels on a touchscreen of game play mechanism 56. The selected reels are held by reel holder 622B of game outcome generator 622. Symbol selector 622A then selects symbols for the remaining, un-held reels from feature reels 641B in the same manner described above. These selected symbols are then displayed on display 54 in conjunction with the held symbols of the held reels. All of the displayed symbols are evaluated by outcome evaluator 624.

In some embodiments, the player may then be provided with a further option to hold the same reels that the player already selected to hold. In one example, where gaming system 75 determines that the player makes "sub-optimal" decisions with respect to selecting which reels to hold, the player is provided with an increased chance of being awarded one or more additional re-spin rounds. For example, a calculation is performed by a player selection monitor 626 using an optimal hold determiner 626A that determines whether the player has made the optimal hold by selecting an optimal hold pattern.

In such an embodiment, after determining that the player has made a sub-optimal selection, player selection monitor 626 determines whether to award one or more re-spin game rounds in order to preserve an appropriate return to player. For example, the chances of player selection monitor 626 awarding a re-spin round may be derived from a calculation as to the return to player "lost" by the player's sub-optimal selection. After determining to award an additional re-spin round, player selection monitor 626 causes a message to be output to the player to make an additional selection of reels, and game outcome generator 622 generates an additional re-spin round, after the player made their selection of which reels to hold.

For each re-spin, a corresponding subsequent game outcome is evaluated by outcome evaluator 624 based on pay table 644. Prize awarder 624A determines whether to award any prize by adding a win to meters 645. In such an embodiment, the game then proceeds to the next free game. Each free game involves an additional cycle of game rounds, including an initial game round, in which candidate game outcomes are generated by the game outcome generator 622 and are assessed by candidate outcome assessor 623, and then a subsequent, "re-spin" game round in which one or more reels are re-spun based on the selection by the player.

Figure 7:
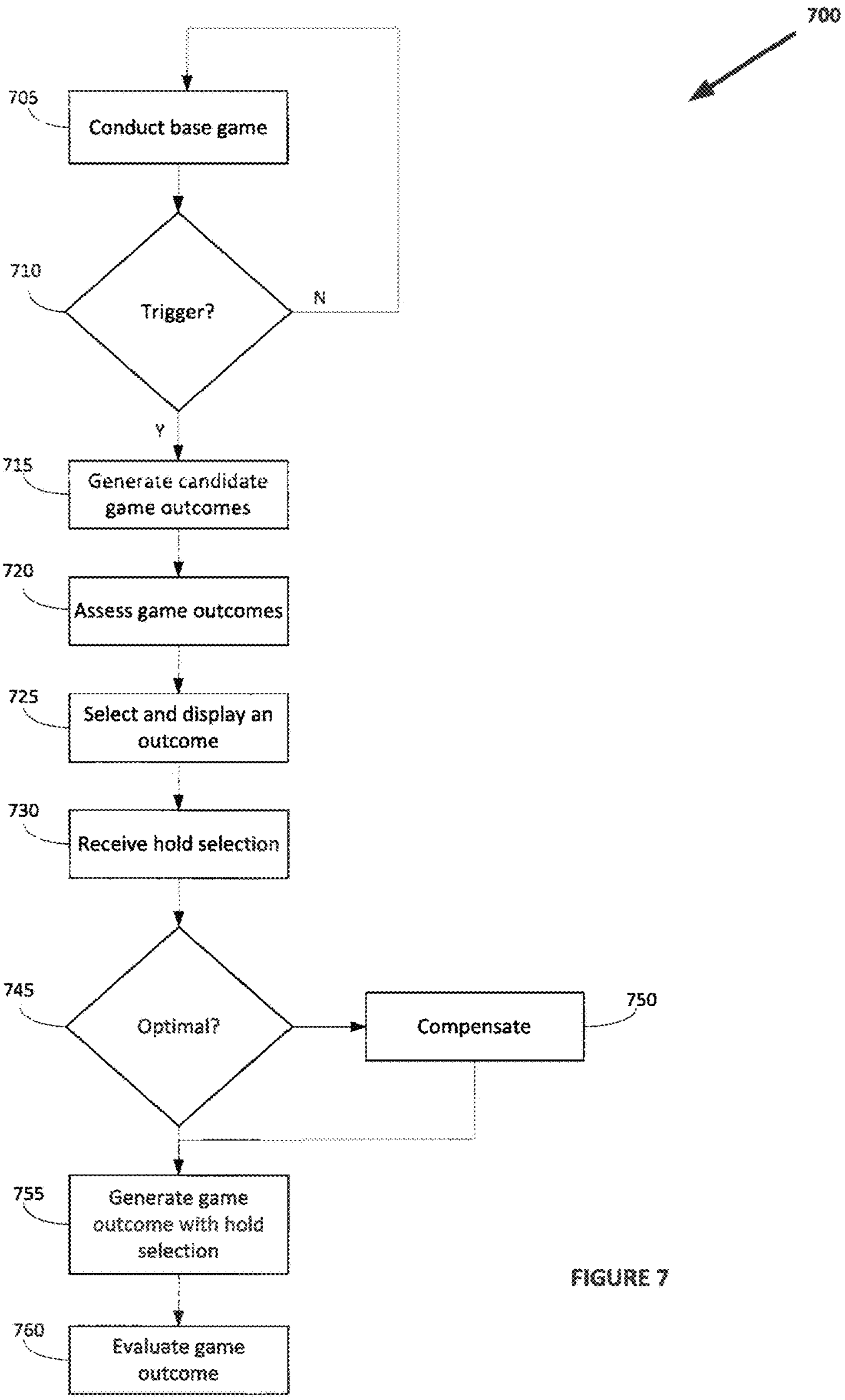
FIG. 7 is a flow chart of an exemplary method of electronic gaming.

FIG. 7 is a flow chart of an exemplary method 700 of electronic gaming. In the exemplary embodiment, method 700 includes conducting 705 a base game, and determining 710 whether a trigger is satisfied. After a trigger is not satisfied, then an additional base game will be conducted assuming the player places an additional wager. Method 700 includes generating 715 candidate game outcomes, assessing 720 the game outcomes, selecting 725 and displaying a game outcome, and receiving 730 a hold selection from a player. Method 700 then involves determining 745 whether the hold is optimal and if it is not optimal, the player selection monitor 626 determines 710 whether to compensate 750 a player for the sub-optimal selection by an awarding the player an additional re-spin. The subsequent game outcome is generated 755 based on the hold selection and is evaluated 760 to determine whether to award any prizes based on pay table. The process then reverts to generating 715 candidate game outcomes until each of the free games are exhausted.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art, will appreciate that program code provides a series of instructions executable by the processor.

In some embodiments, an eligibility criteria may be applied for the player to be eligible for the re-spin feature game, for example, that the player has made a wager of a certain size, made an ante bet, selected all win lines, or played sufficient games, or the player is a member of a loyalty program.

As indicated above, the trigger condition may be satisfied by an occurrence of a symbol combination in the game; however, other trigger conditions could be used, for example, occurrence of a specific symbol in the game, purchase of a trigger, or a trigger may be caused by another connected system, based on turnover, based on a random evaluation, etc.

Typically, a win will result in some form of award being made, such as an award of credits. Such an award may never actually be physically received by a player. For example, many gaming systems provide a player with a “double or nothing” gamble feature, where the player can double or forfeit their credits before commencing another play of the game or cashing out. Further, as credits are fungible, once credits have been added to the credit meter, it is not possible to distinguish between credits that the player has input as cash or the like and credits resulting from an award.

Example

Figure 8:
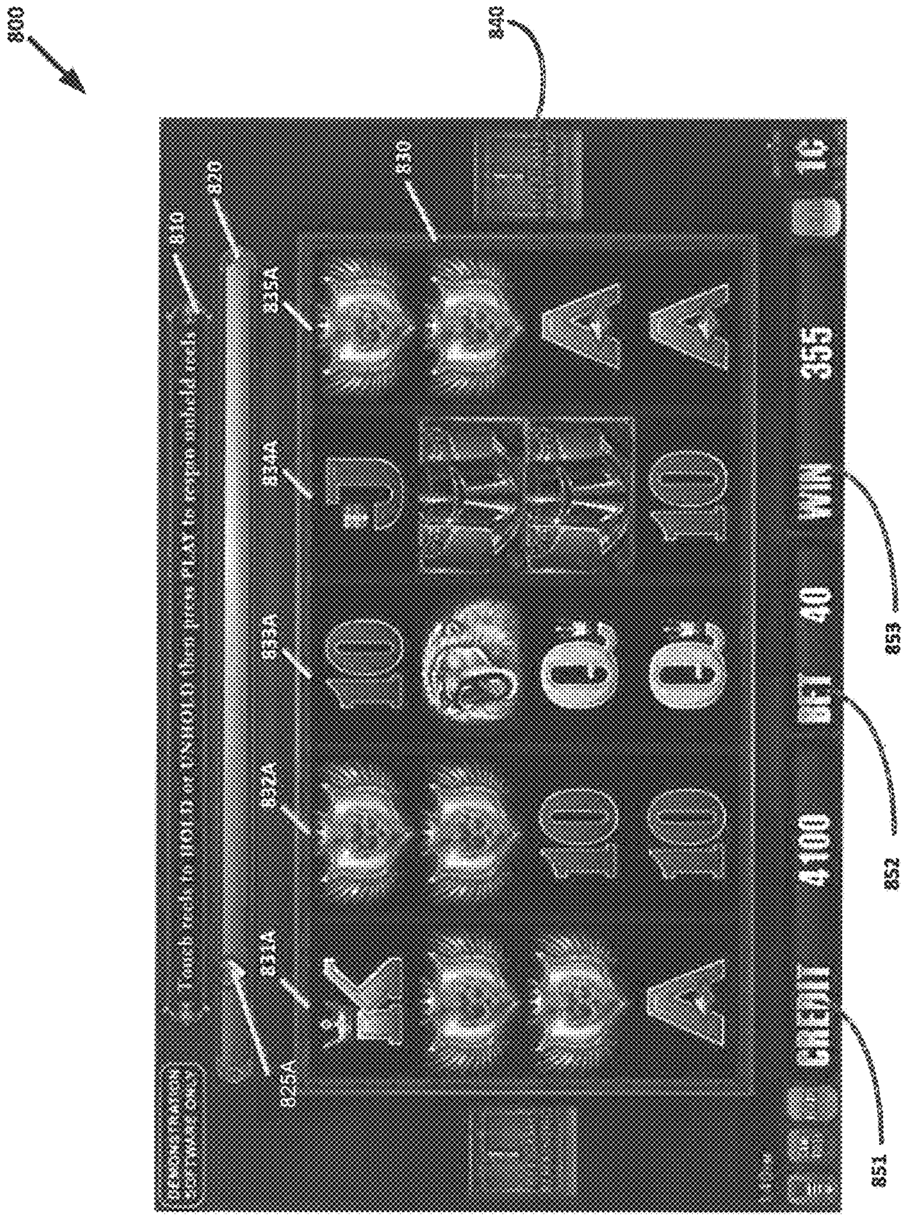
FIG. 8 is an exemplary screen shot that may be used with the gaming machine of FIGS. 2 and 3 and/or with the gaming system of FIGS. 1, 5, and 6.
Figure 9:
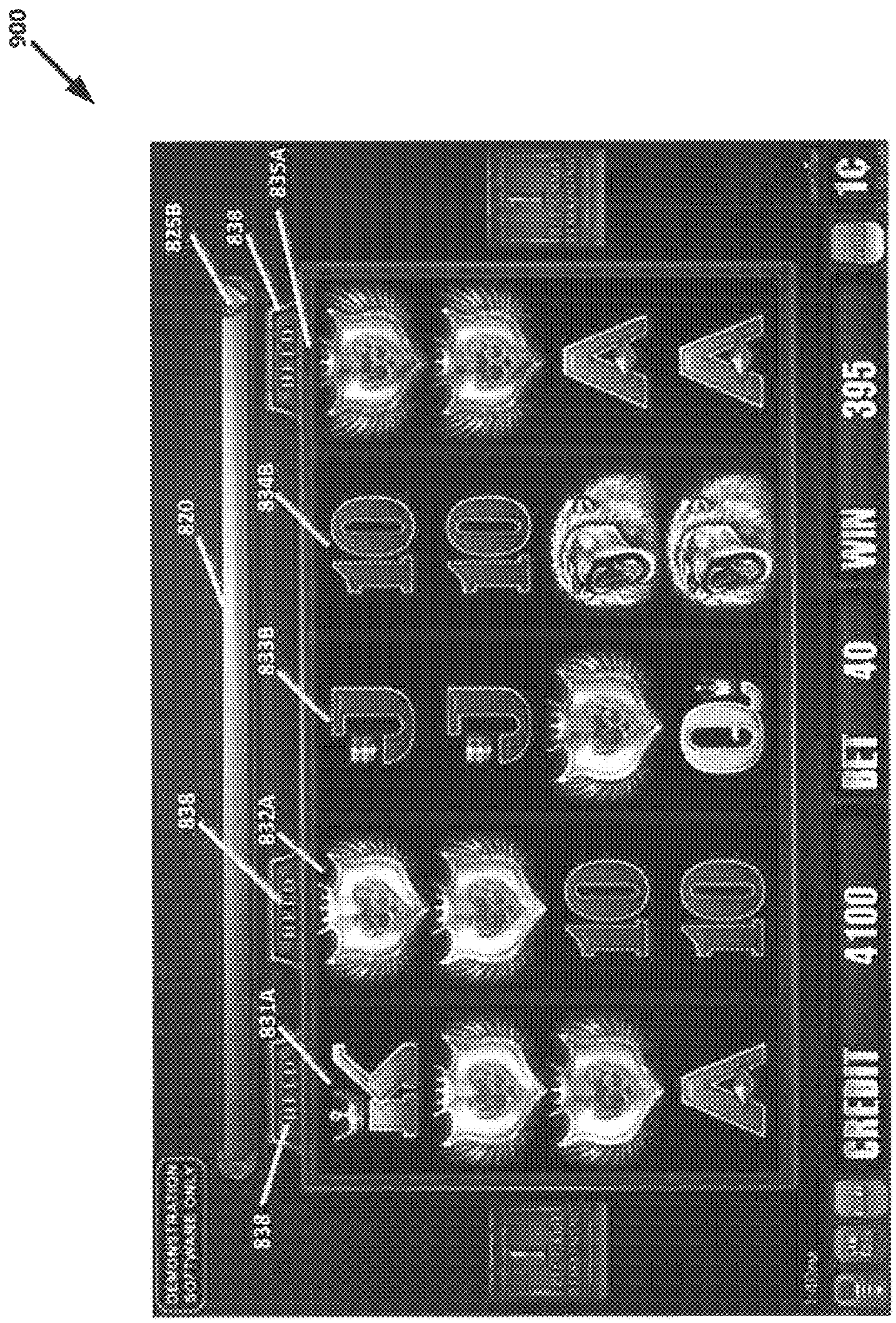
FIG. 9 is an exemplary screen shot that may be used with the gaming machine of FIGS. 2 and 3 and/or with the gaming system of FIGS. 1, 5, and 6.

FIGS. 8 and 9 show exemplary screen shots from an exemplary game, “Red Queen”, implemented by a gaming system in accordance with one embodiment. Red Queen is a 4×5 Reel Power game with a hold and re-spin free games feature. Each free game feature consists of an initial spin and one or more subsequent re-spins in which the player may selectively hold reels.

During the game, a “WILD” symbol substitutes for all symbols except scatters.

All wins are evaluated from left to right only, except scatters, which pay in any position provided the positions are in “bought” positions. All wins are multiplied by the bet multiplier, including scatter wins.

Moreover, in the game, 7, 10, or 25 free games are won with any 3, 4, or 5 SCATTER symbol win, respectively. That is, 3 or more SCATTER symbols trigger the feature and award different numbers of free games.

Each free game consists of an initial spin game round and at least one subsequent re-spin game round. For the initial spin round, all 5 reels are spun. For each re-spin round, the player may optionally hold one or more reels.

In one embodiment, non-optimal hold selections in re-spin rounds are compensated by an increased chance of additional re-spin game rounds being awarded to the player. All hold selections are guaranteed a minimum expected return to player. Game outcomes are evaluated, and wins are paid after each re-spin round. Wins are not paid for the initial spin round.

Feature reels are used during the free games. All scattered SCATTER symbols are removed from all reels during the free games. All reels (Reels 1-5) are played during the feature irrespective of the wager. The bet multiplier for the feature is the same as the bet multiplier for the base game that triggered the feature.

Each initial spin round is selected from a set of candidate spin rounds. A number of candidate spin game rounds are generated in the background. For each candidate spin round, the expected win from an “optimally held re-spin” is calculated. The candidate spin round with the highest expected re-spin win is selected as the initial spin round. The number of candidate spin rounds is determined from a weighting table.

For each re-spin round, the player may hold or unhold a reel by touching the reel on screen.

The player may hold none or all of the reels. On a second or subsequent re-spin round, the player may toggle previously held or unheld reels. After making hold selections, the player presses PLAY to re-spin any unheld reels. The number of re-spin rounds for each free game is determined in such a way that the expected win from the entire free game (i.e., the total from all re-spin rounds) is bounded within a range.

The gaming system is configured so that the player cannot hold a combination of reels if the expected win from the subsequent re-spin is zero. If the player presses PLAY with an invalid hold selection, the gaming system is configured to play an “invalid hold selection” sound. If the player presses PLAY a second (or subsequent) time, the gaming system is configured to play the “invalid hold selection” sound and display an “invalid hold selection” banner or message on a display.

For each re-spin round, there is a hold selection with optimal expected return to player.

As reels are held or unheld, a meter displays the expected return to player relative to the expected return for the optimally held reels.

The feature cannot be triggered again during the feature.

FIGS. 8 and 9 show an exemplary initial game outcome and a subsequent game outcome after the hold and re-spin.

As shown in FIG. 8, five reels 831A-835A have been spun up with a selection of four symbols on each of the reels, such that a symbol display 830 contains twenty selected symbols. Current values are shown on the credit, bet, and win meters 851, 852, and 853, respectively. A screen 800 also includes a free game indicator 840, which, in the exemplary embodiment, indicates that one free game remains. A message 810 at the top of the screen 800 instructs the player to hold or unhold reels by touching them until they make their selection, before pressing the play button (not shown) to spin the unheld reels. An indicator 820 indicates whether the hold selection is optimal. In this respect a slider 825A is shown towards the left of the indicator 820 in FIG. 8 because the player has yet to make a selection, and keeping all of the reels (an option available to the player) would represent a sub-optimal selection by the player. In the illustrated embodiment, positions further towards the right of the indicator 820 represent better selections.

FIG. 9 shows an exemplary screen shot 900 after the player has made their selections and the reels have been re-spun. In this respect, it will be noted that the slider 825B is located at the far right of the indicator 820, indicating that the hold selection made by the player was optimal. A held indicator 838 is displayed above each of the held reels, as selected by the player. It will be noted that each of the reels 831A, 832A, and 835A is identical to that which was shown in FIG. 8. New symbols have been selected and displayed for each of the reels 833B and 834B. The displayed combination of symbols in FIG. 9 have been evaluated by an outcome evaluator, and a prize has been awarded by incrementing the win meter 853 by 40 credits from 355 credits in FIG. 8 to 395 credits in FIG. 9.

It will be understood to persons skilled in the art of the present disclosure that many modifications may be made without departing from the spirit and scope of the present disclosure, in particular it will be apparent that certain features of embodiments of the disclosure can be employed to form further embodiments.

It is to be understood that, if any prior art is referred to herein, such reference does not constitute an admission that the prior art forms a part of the common general knowledge in the art in any country.

In the claims that follow and in the preceding description of the disclosure, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the present disclosure.

What is claimed is:

1. An electronic method of gaming implemented using a gaming system, the gaming system including a display configured to display a wagering game, a player input interface, a credit input mechanism including at least one of a card reader, a ticket reader, a bill acceptor, and a coin input mechanism, the credit input mechanism configured to establish a credit balance that is increasable and decreasable based on wagering activity, and a game controller, said method comprising:

receiving, via the credit input mechanism, a credit wager to initiate play of a base game;

awarding, by the game controller, in a feature game conducted on a plurality of reels, at least two game rounds, the at least two game rounds including at least an initial game round and a subsequent game round, wherein the feature game is triggered by the base game;

generating, by the game controller, a plurality of candidate game outcomes for a plurality of initial game rounds;

determining, by the game controller, for each of the plurality of candidate game outcomes, an expected player benefit to be gained from each of a respective candidate game outcome in the initial game round in combination with a subsequent game outcome in the subsequent game round;

selecting, by the game controller, a candidate initial game round from the plurality of initial game rounds having a candidate game outcome of the plurality of candidate game outcomes associated with a greatest expected benefit;

displaying the candidate game outcome of the selected candidate initial game round on the display of the gaming system as the initial game round;

receiving, via the player input interface, a player selection associated with the displayed candidate game outcome, wherein the player selection includes a selection of at least one reel to hold from the initial game round;

determining whether the player selection is an optimal selection or a sub-optimal selection; and increasing a chance of one or more additional game rounds being awarded when the player selection is a sub-optimal selection.

2. A method as claimed in claim 1, wherein the expected player benefit is associated with keeping none, part, or all of the candidate game outcome.

3. A method as claimed in claim 1, wherein the feature game is a spinning reel game of chance, and the subsequent game round includes a re-spin game round in which a player is provided with an option to hold one or more reels from the initial game round, said method further comprising re-spinning each non-held reel to generate the subsequent game outcome, and wherein determining an expected player benefit to be gained comprises calculating an expected win amount to be gained from an optimal player selection of which of the one or more reels to hold.

4. A method as claimed in claim 1 further comprising:

conducting the subsequent game round based on the selection of at least one reel to hold included in the player selection; and awarding a prize when the subsequent game round corresponds to one or more winning outcomes.

5. A method as claimed in claim 1, wherein the at least two game rounds include at least three game rounds, the at least three game rounds including the initial game round and at least two subsequent game rounds, and wherein a player makes a selection of one or more reels to hold prior to each of the at least two subsequent game rounds.

6. A method as claimed in claim 1 further comprising awarding the at least two game rounds in response to a trigger condition being satisfied in a round of the base game to trigger the feature game.

7. A gaming system comprising:

a display configured to display a wagering game;

a player input interface;

a credit input mechanism including at least one of a card reader, a ticket reader, a bill acceptor, and a coin input mechanism, the credit input mechanism configured to:

receive a credit wager to initiate play of a base game, and establish a credit balance that is increasable and decreasable based on wagering activity; and a game controller configured to:

award, in a feature game conducted on a plurality of reels, at least two game rounds, the at least two game rounds including at least an initial game round and a subsequent game round, wherein the feature game is triggered by the base game;

generate a plurality of candidate game outcomes for a plurality of initial game rounds;

determine, for each of the plurality of candidate game outcomes, an expected player benefit to be gained from each of a respective candidate game outcome in the initial game round in combination with a subsequent game outcome in the subsequent game round;

select a candidate initial game round from the plurality of initial game rounds having a candidate initial game outcome of the plurality of candidate game outcomes associated with a greatest expected benefit;

display the game outcome of the selected candidate initial game round on the display as the initial game round;

receive, via the player input interface, a player selection associated with the displayed candidate game outcome, wherein the player selection includes a selection of at least one reel to hold from the initial game round;

determine whether the player selection is an optimal selection or a sub-optimal selection; and increasing a chance of one or more additional game rounds being awarded when the player selection is a sub-optimal selection.

8. A gaming system as claimed in claim 7, wherein the expected player benefit is associated with keeping none, part, or all of the candidate game outcome.

9. A gaming system as claimed in claim 7, wherein the feature game is a spinning reel game of chance, and the subsequent game round comprises a re-spin game round in which the gaming controller is further configured to:

provide a player of the base game with an option to hold one or more reels from the initial game round;

re-spin each non-held reel to generate the subsequent game outcome; and calculate an expected win amount to be gained from an optimal player selection of which of the one or more reels to hold.

10. A gaming system as claimed in claim 7, wherein the game controller is further configured to:

conduct the subsequent game round based on the selection of at least one reel to hold included in the player selection; and award a prize when the subsequent game round corresponds to one or more winning outcomes.

11. A gaming system as claimed in claim 7, wherein the at least two game rounds include at least three game rounds, the at least three game rounds including the initial game round and at least two subsequent game rounds, and wherein the player input interface is configured to receive a player selection of one or more reels to hold prior to each of the at least two subsequent game rounds.

12. A gaming system as claimed in claim 7, wherein the game controller is further configured to award the at least two game rounds in response to a trigger condition being satisfied in a round of the base game to trigger the feature game.

13. A game controller for a gaming system, the gaming system including a display configured to display a wagering game, a player input interface, and a credit input mechanism including at least one of a card reader, a ticket reader, a bill acceptor, and a coin input mechanism, the credit input mechanism configured to establish a credit balance that is increasable and decreasable based on wagering activity, said game controller comprising:

a processor configured to receive an indication of a credit wager input to the credit input mechanism to initiate play of a base game;

a game awarder configured to award, in a feature game conducted on a plurality of reels, at least two game rounds, the at least two game rounds including at least an initial game round and a subsequent game round, wherein the feature game is triggered by the base game;

a game outcome generator configured to generate a plurality of candidate game outcomes for a plurality of initial game rounds;

a candidate game outcome assessor configured to:

determine, for each of the plurality of candidate game outcomes, an expected player benefit to be gained from each of a respective candidate game outcome in the initial game round in combination with a subsequent game outcome in the subsequent game round, select a candidate initial game round from the plurality of initial game rounds having a candidate game outcome of the plurality of candidate game outcomes associated with a greatest expected benefit, receive a player selection associated with a displayed game outcome of the selected candidate initial game round, wherein the player selection includes a selection of at least one reel to hold from the initial game round, determine whether the player selection is an optimal selection or a sub-optimal selection, and increasing a chance of one or more additional game rounds being awarded when the player selection is a sub-optimal selection; and a display controller configured to control the display of the gaming system to display the candidate game outcome of the selected candidate initial game round as the initial game round.

14. A game controller as claimed in claim 13, wherein the expected player benefit is associated with keeping none, part, or all of the candidate game outcome.

15. A game controller as claimed in claim 13, wherein the feature game is a spinning reel game of chance, and the subsequent game round comprises a re-spin game round in which the game outcome generator is further configured to:

provide a player with an option to hold one or more reels from the initial game round; and re-spin each non-held reel to generate the subsequent game outcome, and wherein the candidate game outcome assessor is further configured to calculate an expected win amount to be gained from an optimal player selection of which of the one or more reels to hold.

16. A game controller as claimed in claim 13, wherein the game outcome generator is further configured to:

conduct the subsequent game round based on the selection of at least one reel to hold included in the player selection, and wherein the game controller further comprises a prize awarder configured to award a prize if the subsequent game round corresponds to one or more winning outcomes.

17. A game controller as claimed in claim 13, wherein the at least two game rounds include at least three game rounds, the at least three game rounds including the initial game round and at least two subsequent game rounds, and wherein the game outcome generator is further configured to receive a player selection of one or more reels to hold prior to each of the at least two subsequent game rounds.

18. A game controller as claimed in claim 13, wherein the game awarder is configured to award the at least two game rounds in response to a trigger condition being satisfied in a round of the base game to trigger the feature game.

* * * * *